US012050429B2

(12) United States Patent
Matsui et al.

(10) Patent No.: US 12,050,429 B2
(45) Date of Patent: Jul. 30, 2024

(54) IMAGE FORMING APPARATUS WITH DECELERATION OF CONVEYANCE SPEED OF RECORDING MATERIAL UPSTREAM OF DETECTING UNIT OR STOPPING OF CONVEYANCE OF RECORDING MATERIAL

(71) Applicant: CANON KABUSHIKI KAISHA, Tokyo (JP)

(72) Inventors: Shotoku Matsui, Kanagawa (JP); Hironobu Nihei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/300,682

(22) Filed: Apr. 14, 2023

(65) Prior Publication Data

US 2023/0341803 A1 Oct. 26, 2023

(30) Foreign Application Priority Data

Apr. 25, 2022 (JP) ................................ 2022-071381
Mar. 28, 2023 (JP) ................................ 2023-051507

(51) Int. Cl.
*G03G 15/00* (2006.01)
*B65H 5/06* (2006.01)

(52) U.S. Cl.
CPC ........... *G03G 15/6567* (2013.01); *B65H 5/06* (2013.01); *G03G 15/50* (2013.01); *G03G 15/6564* (2013.01); *G03G 15/6579* (2013.01); *B65H 2513/10* (2013.01); *B65H 2513/512* (2013.01)

(58) Field of Classification Search
CPC ............... G03G 15/50; G03G 15/6529; G03G 15/6564; G03G 15/6567; G03G 15/6579; G03G 15/1605; B65H 5/06; B65H 2513/10; B65H 2513/512; B65H 85/00; B65H 2701/1311; B65H 2801/06
See application file for complete search history.

(56) References Cited

U.S. PATENT DOCUMENTS

| | | | | |
|---|---|---|---|---|
| 9,731,525 | B2 | 8/2017 | Nihei | |
| 10,120,318 | B2 | 11/2018 | Nihei | |
| 11,106,170 | B2 * | 8/2021 | Kamada | G03G 15/6511 |
| 2017/0168435 | A1 * | 6/2017 | Oyama | G03G 15/6529 |
| 2017/0168445 | A1 * | 6/2017 | Oyama | G03G 15/6579 |
| 2021/0364965 | A1 * | 11/2021 | Matsui | G03G 15/657 |

FOREIGN PATENT DOCUMENTS

| | | | | |
|---|---|---|---|---|
| JP | 2008-185678 | A | 8/2008 | |
| JP | 2009-192633 | A | 8/2009 | |
| WO | WO-2012050217 | A1 * | 4/2012 | B41J 13/0045 |

* cited by examiner

*Primary Examiner* — Sophia S Chen
(74) *Attorney, Agent, or Firm* — Venable LLP

(57) ABSTRACT

An image forming apparatus includes a registration roller, a revering roller, and a detecting unit to detect a recording material. A control unit, in a case in which (i) the recording material has a length such that the recording material is conveyed by the registration roller in a state in which a trailing end of the recording material has not passed the reversing roller and (ii) the recording material is conveyed by the registration roller and the reversing roller, decelerates a conveyance speed of the recording material upstream of the detecting unit in a conveyance direction, or controls to stop the conveyance of the recording material.

11 Claims, 10 Drawing Sheets

IMAGE FORMING APPARATUS WITH DECELERATION OF CONVEYANCE SPEED OF RECORDING MATERIAL UPSTREAM OF DETECTING UNIT OR STOPPING OF CONVEYANCE OF RECORDING MATERIAL

FIELD OF THE INVENTION AND RELATED ART

The present invention relates to an image forming apparatus, for example, an image forming apparatus using an electrophotographic process or the like.

In an image forming apparatus (e.g., copier, printer) using an intermediary transfer member, a toner image is formed on a photosensitive drum (image bearing member) by developing rollers, and the toner image is primarily transferred to the intermediary transfer member. The toner image on the intermediary transfer member is then secondarily transferred in a batch onto a recording material such as paper, and the recording material on which the toner image has been transferred is passed through a fixing unit, thereby forming an image on the recording material. In such image forming apparatuses, variations occur in the timing of arrival at the secondary transfer position after the recording material is fed into the image forming apparatus due to an amount of stacked paper in the cassette, a taken out amount of leading paper, a wear condition of feeding rollers, a type of media (recording material), and other factors.

In Japanese Laid-Open Patent Application No. 2009-192633, the following control is performed. To align a leading end of the recording material with the image transferred to the intermediary transfer member, a time difference between the leading end of the recording material and the image is detected at the timing when the leading end of the recording material is detected by a conveyance sensor placed upstream in a conveyance direction from the secondary transfer portion (hereafter, registration sensor). Then, before reaching the secondary transfer roller, a conveyance speed of the recording material is accelerated or decelerated or stopped to eliminate a detected time difference, thereby improving transfer accuracy. Such control is hereinafter referred to as conveyance speed control.

In image forming apparatuses, the following issues arise when recording material is conveyed to the secondary transfer position by multiple driving rollers with different drive sources, and when recording material of a size that can be conveyed across multiple driving rollers is used. That is, when one drive source is stopped and the other is driven in conveyance speed control, the recording material may be damaged.

SUMMARY OF THE INVENTION

The purpose of the present invention is to perform successful image formation without affecting the recording material in an image forming apparatus in which conveyance to the secondary transfer position is performed by a plurality of drive sources.

The present invention has the following configuration.

An image forming apparatus comprising: a first conveyance unit configured to convey a recording material; a first driving unit configured to drive the first conveyance unit; a second conveyance unit configured to convey the recording material, the second conveyance unit being provided upstream of the first conveyance unit in a conveyance direction of the recording material; a second driving unit configured to drive the second conveyance unit, the second driving unit being different from the first driving unit; an intermediary transfer member configured to carry a toner image transferred from a photosensitive drum, a transfer unit configured to transfer the toner image on the intermediary transfer member to the recording material in a transfer position; a detecting unit configured to detect the recording material, the detecting unit being provided upstream of the transfer position in the conveyance direction; and a control unit configured to execute a first control in response to an arrival of a leading end of the recording material to the detecting unit, the control unit controls in the first control the first driving unit to accelerate or decelerate a conveyance speed of the recording material, wherein in a case in which (i) the recording material has a length such that the recording material is conveyed by the first conveyance unit in a state in which a trailing end of the recording material has not passed the second conveyance unit and (ii) the recording material is conveyed by the first conveyance unit and the second conveyance unit, the control unit executes a second control before executing the first control and a conveyance of the recording material is continued in the first control, and wherein in the second control the control unit decelerates the conveyance speed of the recording material upstream of the detecting unit in the conveyance direction, or controls the first driving unit and the second driving unit so as to stop the conveyance of the recording material.

Further features of the present invention will become apparent from the following description of exemplary embodiments with reference to the attached drawings.

BRIEF DESCRIPTION OF THE DRAWINGS

Parts (a) and (b) of FIG. 1 are cross-sectional drawings of a configuration of a laser printer according to embodiments 1 and 2.

DESCRIPTION OF THE EMBODIMENTS

Figure 1:
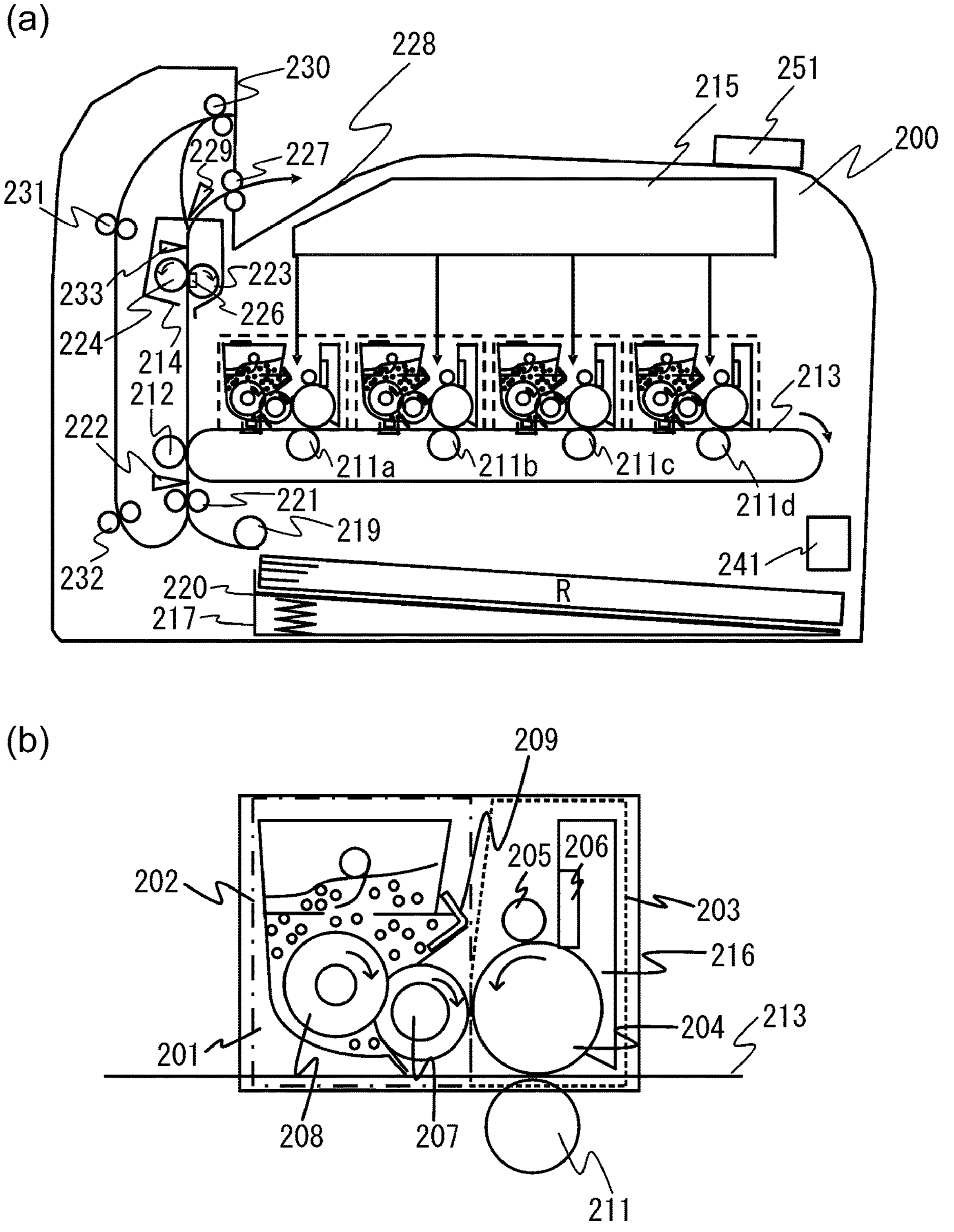

The following is a description of the embodiments of the present invention referring to the drawings. The following embodiments are not intended to limit the present invention according to the claims, and not all of the combinations of features described in the embodiments are essential to the solution of the present invention.

Embodiment 1

FIG. 1 shows the schematic configuration of an image forming apparatus 200 according to embodiment 1. Part (a) of FIG. 1 shows a schematic diagram of the entire image forming apparatus 200, and part (b) of FIG. 1 shows an enlarged diagram of one process cartridge, which is the image forming means, of the entire image forming apparatus 200. However, the components, dimensions, arrangement, etc. in the embodiment should be changed as appropriate, and do not limit the scope of the present invention.

(Overall Configuration of the Image Forming Apparatus)

Referring to FIG. 1, the overall configuration of the image forming apparatus 200 is described. FIG. 1 shows the schematic cross-sectional drawing of the image forming apparatus 200 according to embodiment 1, and each configuration is shown in simplified form.

The image forming apparatus 200 according to embodiment 1 is equipped with a plurality of detachable process cartridges 201. A process cartridge 201 consists of a developing unit 202 and a photosensitive drum unit 203. The photosensitive drum unit 203 consists of a photosensitive drum 204, which is an image bearing member of an electrostatic latent image, a charging roller 205, which is a charging means for charging the photosensitive drum 204, and a cleaning blade 206, which is a cleaning means for the photosensitive drum 204.

In the image forming apparatus 200, a transfer roller 211 is installed at a position opposing the photosensitive drum 204 to transfer the toner image on the photosensitive drum 204 to an intermediary transfer member, the intermediary transfer belt 213. Note that for transfer rollers 211*a*, 211*b*, 211*c*, and 211*d* in part (a) of FIG. 1, the subscripts a through d in the symbols represent different colors (e.g., yellow, magenta, cyan, black, etc.).

The photosensitive drum unit 203 is equipped with the cleaning blade 206 for cleaning the toner that remains on the photosensitive drum 204 without being transferred to the intermediary transfer belt 213. A developing unit 202 is mounted around the photosensitive drum 204. In the developing unit 202, a developing roller 207, which is a developing means, a supplying member 208, and a developing blade 209, which is a regulating member, are arranged.

The developing roller 207 is a roller that carries toner as a developer and develops the electrostatic latent image formed on the surface of the photosensitive drum 204 with the toner. The supplying member 208 is positioned around the developing roller 207 and supplies and removes toner from the developing roller 207. The developing blade 209 is a regulating member for regulating the supplied toner to a predetermined amount.

The toner image formed on each photosensitive drum 204 is transferred from each photosensitive drum 204 to the intermediary transfer belt 213 (on the intermediary transfer member), forming a full-color image on the intermediary transfer belt 213 (primary transfer).

The toner image formed on the intermediary transfer belt 213 is transferred by a secondary transfer roller 212, which is a transfer means, to the recording material R that is conveyed in a timed manner (secondary transfer). The position where the toner image on the intermediary transfer belt 213 is transferred to the recording material R by the secondary transfer roller 212 is hereinafter referred to as the secondary transfer position (transfer position) or secondary transfer portion.

The unfixed toner transferred onto (on) the recording material R is subjected to pressure and heat as it passes through the fixing device 214, which fixes the toner on the recording material R. A fixing device 214 has a heater 226 and is provided downstream of the registration roller 221 and the secondary transfer position described below in the conveyance direction of the recording material R.

An exposure unit 215 for forming an electrostatic latent image corresponding to the image data on the charged photosensitive drum 204 is attached to the image forming apparatus 200. A power source (not shown) is attached to the image forming apparatus 200 for applying a predetermined voltage to each of the charging roller 205, developing roller 207, developing blade 209, supplying member 208, and transfer roller 211.

A control portion 241 controls the driving and voltage control of the process cartridge 201 and fixing device 214, as well as the transfer timing to the recording material R. The control portion 241 includes an engine portion 302, which is described later. The control portion 241 is connected to a controller (not shown), which receives information on printed image size and image color converted to laser emission as print commands in response to printing instructions from the user.

The image forming apparatus 200 is equipped with an operating portion 251. The operating portion 251 is provided with various known input means for inputting various information by the user and known display means for displaying various information. For example, the user can use the operating portion 251 to set the paper size, paper type (plain paper, thin paper, thick paper, etc.), etc. of the recording material R to be printed.

For example, the engine control portion 302 determines that the recording material R is a long sheet of paper, as described below, based on information input from the operating portion 251. The engine control portion 302 can also determine whether the recording material R is a long sheet of paper based on the output signals of the registration sensor 222 or discharge sensor 233, as described below. The information indicating that the recording material R is a long sheet of paper may be input from an external device connected to the image forming apparatus either wired or wirelessly.

(Explanation of the Image Forming Operation)

The exposure unit 215, which exposes the charged photosensitive drum 204, exposes light to the photosensitive drum 204 in the main scanning direction using a laser beam according to image data. The exposure in the main scanning direction is timed with respect to the sub-scanning direction. As a result, an electrostatic latent image is formed on the photosensitive drum 204. Here, the portion on the photosensitive drum 204 where the image is formed (hereinafter referred to as the image forming portion) is at light potential. The main scanning direction refers to the rotation axis direction of the photosensitive drum 204, and the sub-scanning direction refers to the rotation moving direction of the photosensitive drum 204, i.e., the direction orthogonal to the rotation axis direction.

The developing roller 207 attached to the developing unit 202 carries toner as a developer and contacts the photosensitive drum 204 during image formation to develop the electrostatic latent image with the toner. Since developing is performed by the potential difference between the light potential and the developing roller 207, a predetermined developing voltage is applied to the developing roller 207. The developing roller 207 rotates in the opposite direction of the photosensitive drum 204, and its surface speed is different from that of the photosensitive drum 204. The toner uses a charge assisting agent such as silica or titanium dioxide as an external additive, and the flowability and chargeability of the toner are controlled by the additive. The toner image developed on the photosensitive drum 204 is sent to the contact portion (primary transfer portion) between the intermediate transfer belt 213 and the photosensitive drum 204, where it is transferred onto the intermediary transfer belt 213. A predetermined transfer voltage is applied to the transfer roller 211 by a power source (not shown) so that a predetermined potential difference is generated between the transfer roller 211 and the photosensitive drum 204.

Toner that is not transferred in the primary transfer portion is removed by the cleaning blade 206. The cleaning blade 206 is mounted so that it is opposite (i.e., in the counter direction) to the rotation direction of the photosensitive drum 204. By bringing the cleaning blade 206 into contact with the photosensitive drum 204 in the counter direction and with appropriate contact pressure, the residual toner can be consistently removed from the photosensitive drum 204. The removed toner is stored in the waste toner compartment 216. By removing the toner through cleaning, the surface of the photosensitive drum 204 can be charged again by the charging roller 205 with no toner, etc. on the surface of the photosensitive drum 204.

By repeating this process, a toner image can be formed on the intermediary transfer belt 213.

Thereafter, toner images of each color from multiple process cartridges are superimposed sequentially on the intermediary transfer belt 213 to form a superimposed full-color image. The full-color image is transferred to the recording material R, which is conveyed by the secondary transfer roller 212 in a timed manner.

(Explanation of the Conveyance Operation of the Recording Material)

A paper feeding portion 217 is a paper feeding cassette as a means of storing recording material R, in particular, recording paper for image forming portion. When feeding paper from the paper feeding portion 217, a bottom plate 220 is raised by a driving roller 219 driven by a drive source (not shown) to push up the recording materials R placed inside the paper feeding portion 217. The top sheet of the pushed-up recording materials R contacts a pick-up roller 219, and is separated and conveyed one sheet at a time by the rotation of the pick-up roller 219 and conveyed to the registration roller 221, which is the first conveyance means. The recording material R fed from the paper feeding portion 217 is conveyed by the registration roller (first roller) 221, which is driven by a feeding motor (first motor) 332, described below.

The recording material R is conveyed to the secondary transfer portion so that the leading end of the image and the leading end of the recording material R are aligned based on the timing when the leading end of the recording paper R is detected by the registration sensor 222, using the conveyance speed control described below. The registration sensor 222 is installed upstream of the secondary transfer portion in the conveyance direction and functions as a detection means for detecting the recording material R. The registration sensor 222 can detect when the conveyance of the recording material R by the registration roller 221 starts, i.e. when the leading end of the recording material R reaches the registration roller 221.

In the secondary transfer portion, the toner image is transferred from the intermediary transfer belt 213 to the recording material R. The recording material R on which the unfixed toner image is transferred is then sent to the fixing device 214. The fixing device 214 fixes the secondarily transferred visible image (toner image) to the recording material R.

The fixing device 214 has a fixing roller 223 for heating the recording material R and a pressure roller 224 for pressing the recording material R against the fixing roller 223. The fixing roller 223 and pressure roller 224 of the fixing device 214 are arranged so that they can be rotated in the arrow direction by the fixing motor (second motor) 352 described below. A heater 226 is built into the inside of the fixing roller 223. As a result, the recording material R holding a visible image is conveyed by the fixing roller 223 and the pressure roller 224, and heat and pressure are applied to fix the melted toner to the recording material R.

A discharge roller pair 227 is rotated by the fixing motor 352, described below, to stack the recording material R after fixing of the visible image by the fixing device 214, and discharges the recording material R to the stacking portion 228. The above is the operation when printing is completed on only the first side of a recording material R (hereinafter referred to as single-sided printing), or when printing is also completed on the first and second side, which is the opposite side of the first side, of a recording material R (hereinafter referred to as double-sided printing).

(Explanation of the Reversing Path)

The image forming apparatus 200 of embodiment 1 is capable of double-sided printing, in which image formation is performed on the first side (also called the front side) and the second side (also called the back side) opposite to the first side of the recording material R. The reversing portion has a flapper 229, a reversing roller pair 230 including a reversing roller (second roller) as the secondary conveyance means, and a conveyance roller pair 231, 232 including a conveyance roller (first roller) as the primary conveyance means. Conveyance roller pairs 231 and 232 are provided in the double-sided conveyance path.

The flapper 229 changes the conveyance path of the recording material R that has passed through the fixing roller 223 and pressure roller 224. The flapper 229 is configured to switch the conveyance path to either the discharge roller pair 227 or the reversing roller pair 230, depending on the reversing solenoid 345 described below.

The fixing motor 352 can rotate the reversing rollers of the reversing roller pair 230 in a direction to draw the recording material R into the reversing portion, or to rotate the drawn recording material R in a conveyance direction to the conveyance roller pair 231. The fixing motor 352 can rotate the reversing rollers of the reversing roller pair 230 in a first direction and in a second direction opposite to the first direction. The switching of the rotation direction of the reversing roller pair 230 is configured to work in conjunction with the moving direction of the flapper 229.

The conveyance roller pairs 231 and 232 are configured to be able to convey recording material R that has passed through the fixing device 214 in the direction of the secondary transfer roller 212. The discharge roller pair 227, reversing roller pair 230, fixing device 214, pick-up roller 219, registration roller 221, and conveyance roller pairs 231 and 232 are supplied with driving power by the drive source (paper feeding motor 332 and fixing motor 352). The discharge roller pair 227, reversing roller pair 230, and fixing device 214 are driven by the fixing motor 352. The pick-up roller 219, registration roller 221, and conveyance roller pairs 231 and 232 are driven by the paper feeding motor 332.

The reversing portion is equipped with a double-sided clutch 343, described below, and conveyance roller pairs 231 and 232, placed in the double-sided conveyance path, are rotated or stopped by the double-sided clutch 343.

(Explanation of the Feeding of the Recording Material R in the Reversing Portion)

The conveyance operation of the reversing portion includes reversing the conveyance direction and the conveyance from the reversing path to the registration roller 221. In the operation of reversing the conveyance direction, the reversing portion drives the reversing solenoid 345, which changes the position of the flapper 229, based on the timing when the leading end of the recording material R reaches the discharge sensor 233. The reversing portion changes the conveyance direction of the recording material R after fixing the visible image by the fixing device 214 and leads the recording material R to the reversing roller pair 230. The reversing portion stops the reversing solenoid 345 and changes the rotation direction of the reversing roller pair 230 based on the timing when the trailing end of the recording material R exits the discharge sensor 233, feeding recording material R in the conveyance direction of the reversing path.

In the conveyance of the recording material R from the reversing path to the registration roller 221, the reversing portion drives the double-sided clutch 343 to supply driving force to the conveyance roller pairs 231 and 232 to rotate them, and performs the conveyance speed control (first control) described below when the registration sensor 222 detects the recording material R. In the conveyance speed control for the recording material R conveyed from the reversing path, when a one-time stop control is selected, the double-sided clutch 343 is stopped and the supply of driving force to the conveyance roller pairs 231 and 232 on the reversing path is stopped.

(Explanation of Functional Block Diagram)

Figure 2:
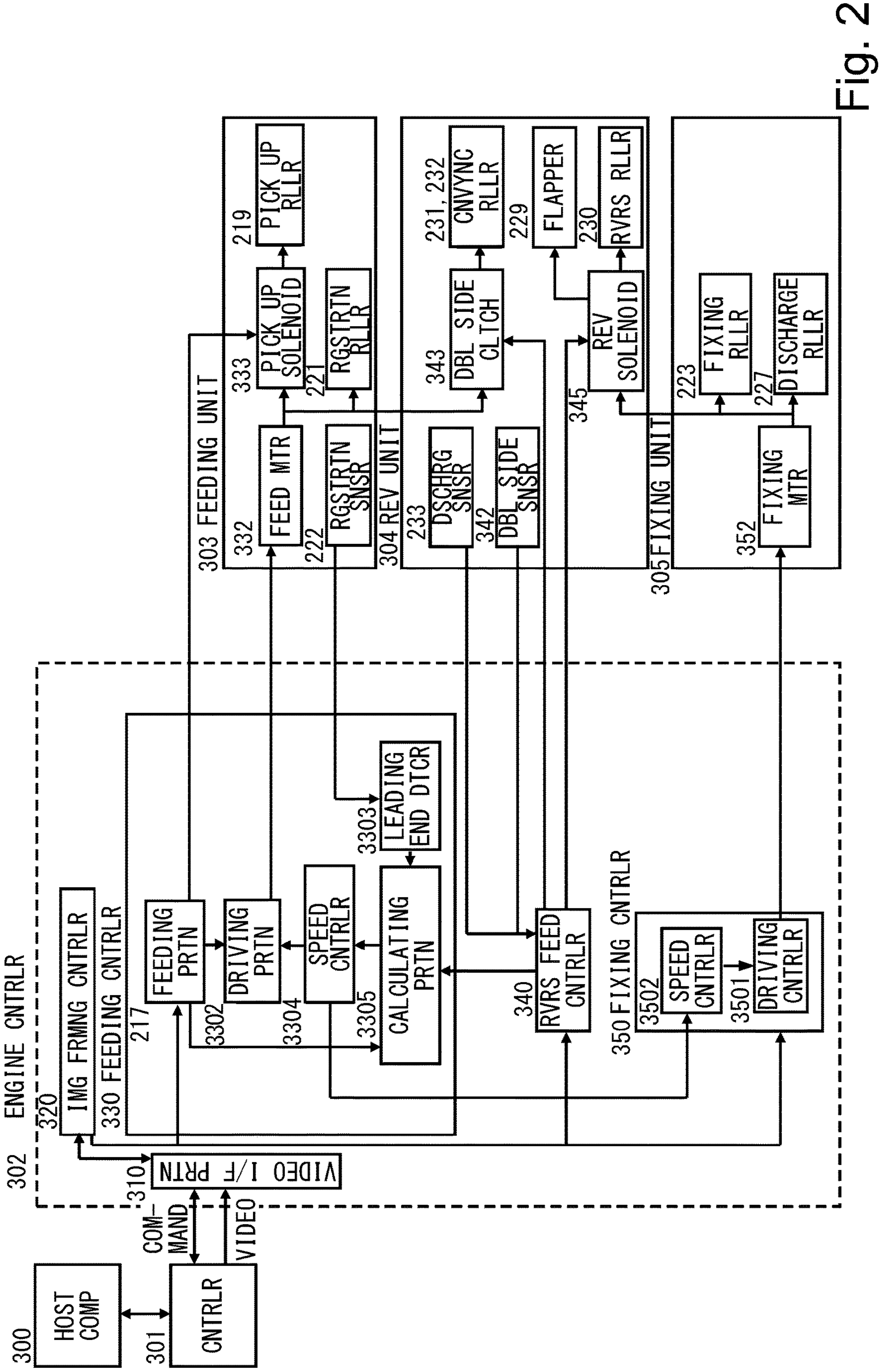
FIG. 2 is a schematic system diagram of the laser printer according to embodiments 1 and 2.

FIG. 2 is a functional block diagram according to the engine control portion 302 of the laser printer as image forming apparatus 200. In the following, the functional blocks related to the control of the conveyance of the recording material R during printing is explained. The controller portion 301 can communicate with a host computer 300 and the engine control portion 302 mutually. When the controller portion 301 receives (inputted) print data from the host computer 300, it expands the print data and converts it into image data for image forming. It then generates video signals for exposure for four colors for exposure based on that image data.

When the controller portion 301 completes the generation of the video signal, it instructs a video interface portion 310 of the engine control portion 302 as the control means to start printing. The engine control portion 302 has a built-in ROM (read-only memory) and RAM (random access memory), a microcomputer (not shown) including a microprocessor as a CPU (central processing unit), and a timer (not shown). The engine control portion 302 exchanges information with the controller portion 301 via serial communication, and performs the control described below based on the information received from the controller portion 301.

When the video interface portion 310 receives a print start instruction from the controller portion 301, it sends the print start instruction to an image forming control portion 320 of the engine control portion 302. Based on the received print start instruction, the image forming control portion 320 activates various actuators and starts preparation for image formation. When the image forming control portion 320 is ready for image formation, it notifies the controller portion 301 of the completion of image forming preparation via the video interface portion 310. When the controller portion 301 receives the image forming preparation complete, it sends a video signal to the video interface portion 310. The image forming control portion 320 performs image formation based on the video signal received at the video interface portion 310.

A feeding conveyance control portion 330 of the engine control portion 302 has a paper feeding portion 217, a driving portion 3302 of the paper feeding motor 332, a leading end detection portion 3303 of the recording material, a paper conveyance speed control portion 3304 of the paper feeding motor 332, and a calculation portion 3305 that calculates the conveyance speed control timing. Based on the print start timing received by the image forming control portion 320, the pick-up solenoid 333 and the paper feeding motor 332, which is the first driving portion, rotate the pick-up roller 219, which is in the paper conveyance unit 303. As a result, the recording materials R stacked in the paper feeding portion 217 are separated and fed one sheet at a time. As a result, the feeding conveyance control portion 330 feeds the recording material R toward the registration sensor 222. The leading end detection unit 3303 of the recording material detects that the fed recording material R has reached the registration sensor 222.

The calculation portion 3305 calculates the conveyance speed and conveyance speed control timing at the timing when the leading end of the recording material R reaches the registration sensor 222. The method of calculating the conveyance speed and conveyance speed control timing is described below. The conveyance speed control portion 3304 of the paper feeding motor 332 aligns the leading end of the image and the leading end of the recording material in the secondary transfer portion by controlling the speed of the paper feeding motor 332 by the driving portion 3302 at the conveyance speed control timing calculated by the calculation portion 3305. The feeding conveyance control portion 330 controls the conveyance speed of the recording material R by controlling the paper feeding motor 332 so that the toner image on the intermediary transfer belt 213 is transferred to the recording material R at the secondary transfer position in response to the leading end of the recording material R reaching the registration sensor 222. Specifically, the feeding conveyance control portion 330 performs the first control, conveyance speed control (S1, described below), which accelerates or decelerates the paper feeding motor 332 or stops the conveyance of the recording material R.

The fixing conveyance control portion 350 of the engine control portion 302 includes the conveyance speed control portion 3502 of the fixing motor 352 and a driving portion 3501 of the fixing motor 352. The fixing conveyance control portion 350 controls the fixing motor 352, which is the second driving means of a fixing conveyance unit 305, based on the print start timing of the image forming control portion 320, and conveys the recording material R with the fixing roller 223 and the discharge roller pair 227, both of which are driven by the fixing motor 352.

The reversing and conveyance control portion 340 of the engine control portion 302 controls the double-sided clutch 343 and the reversing solenoid 345 based on the detection timing of the discharge sensor 233 and the double-sided sensor 342 of the reversing unit 304, in accordance with the print start timing of the image forming control portion 320.

This way, the reversing and conveyance control portion 340 controls the reversing and discharging of the recording material R. By controlling the reversing solenoid 345, the reversing and conveyance control portion 340 switches the rotation direction of the reversing roller pair 230, whose fixing motor 352 is the driving source, and also switches the conveyance path of the recording material R by means of the flapper 229 to either the reversing portion or the stacking portion 228. The conveyance roller pairs 231 and 232 are driven by the paper feeding motor 332, and by controlling the double-sided clutch 343, the conveyance roller pairs 231 and 232 can be switched to stop or drive.

(Conveyance Speed Control when Performing Double-Sided Conveyance of Long Sheets of Paper)

Figure 3:
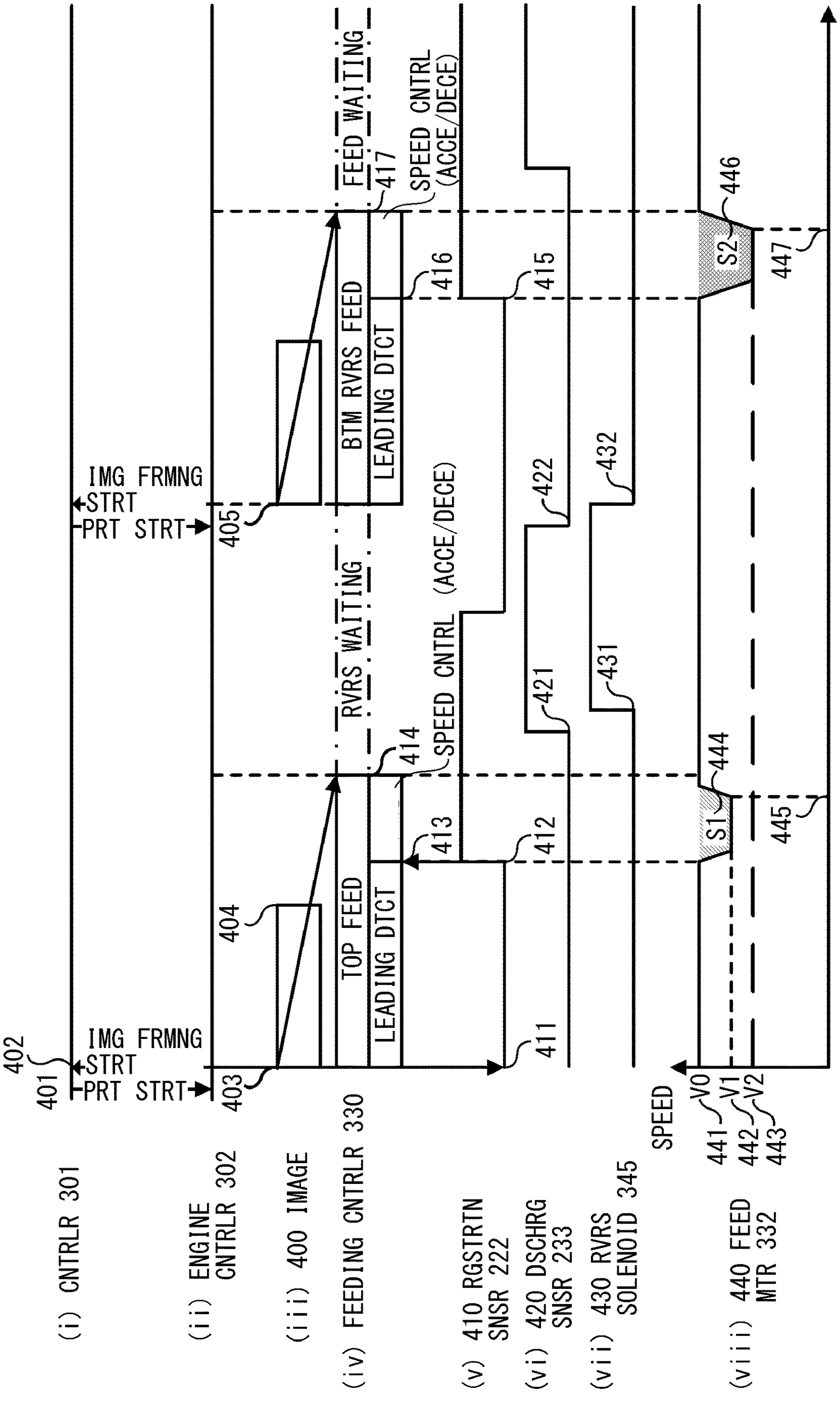
FIG. 3 is a timing chart showing the conveyance speed control during double-sided printing of a long sheet of paper according to embodiment 1.
Figure 4:
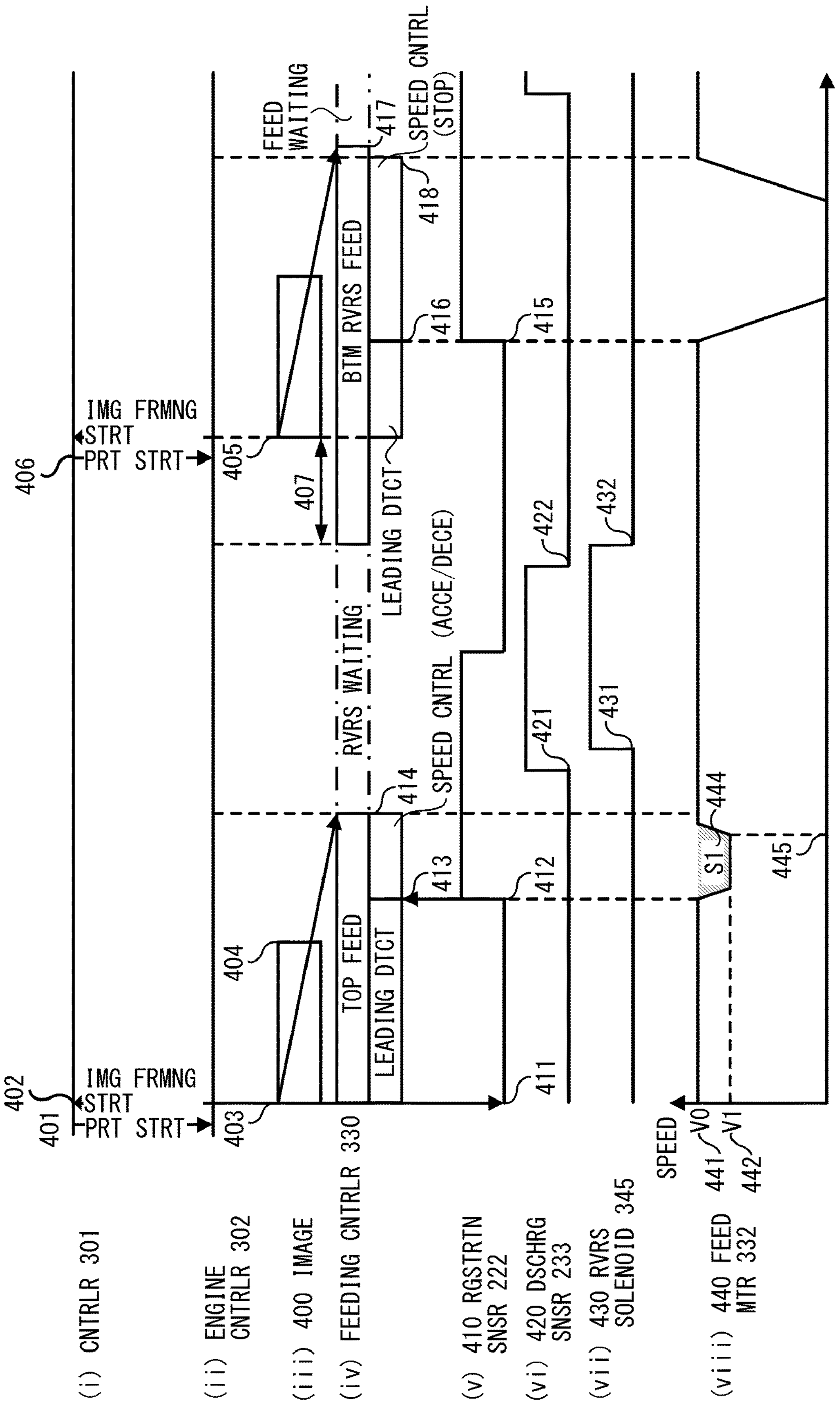
FIG. 4 is a timing chart showing the conveyance speed control during double-sided printing of a long sheet of paper according to embodiment 1.

Next, conveyance speed control in the case of double-sided printing on a long sheet of paper is explained using FIGS. 3 and 4. Conveyance speed control means that when the leading end of the recording material R is detected by the registration sensor 222, the motor is accelerated, decelerated, or stopped to control the conveyance speed of the recording material R so that the leading end of the recording material R and the leading end of the image on the intermediary transfer belt 213 are aligned in the secondary transfer portion. FIG. 3 shows a timing chart of conveyance speed control in which motor acceleration/deceleration is performed to align the leading end of the recording material R with the leading end of the image. FIG. 4 is a timing chart of conveyance speed control in which the motor is temporarily stopped to align the leading end of the recording material R with the leading end of the image.

In FIGS. 3 and 4, (i) shows the timing of commands sent or received by the controller portion 301. (ii) shows the timing of the commands sent or received by the engine control portion 302. (iii) shows the timing of the image on the intermediary transfer belt 213 (400). (iv) indicates the state of control by the feeding conveyance control portion 330 (e.g., feeding the front side, waiting for reversing, back side reverse conveyance, waiting for paper feeding, etc.). (v) shows the output signal (low- or high-level) of the registration sensor 222 (410), and (vi) shows the output signal (low- or high-level) of the discharge sensor 233 (420). (vii) shows the reversing solenoid 345 state (430), indicating that it is stopped when low-level and driven when high-level. (viii) shows the speed of the paper feed motor 332 (440). The speed of the paper feed motor 332 can take, for example, V0 (441), V1 (442), V2 (443), etc. between the maximum and minimum speed. The horizontal axis indicates time.

The long sheet of paper in this configuration is defined as recording material R of a length Ls greater than or equal to the distance from the reversing roller pair 230 to the registration sensor 222 on the reversing path, but the length at which the issue occurs differs depending on the configuration of the apparatus. In other words, if the length of recording material R is longer than the distance from the registration sensor 222 to the second conveyance means (second roller) driven by the second driving means (second motor), the recording material R is a long sheet of paper.

The engine control portion 302 determines that the recording material R is a long sheet of paper based on information input from the operating portion 251 or information received from the controller portion 301. The engine control portion 302 can also determine whether the recording material R is a long sheet of paper based on the output signals of the registration sensor 222 or the discharge sensor 233. Sensors other than the registration sensor 222 and discharge sensor 233 can also be used. In that case, the engine control portion 302 can measure the length of the recording material R with the registration sensor 222 or the discharge sensor 233 while printing on one side of the recording material R to determine whether the recording material R is a long sheet of paper.

In other words, the image forming apparatus 200 has sensors for detecting the length of the recording material R, and the registration sensor 222 or the discharge sensor 233 can be one of them.

In the present embodiment, the registration sensor 222, discharge sensor 233, and other sensors for detecting recording material R can have a contacting portion that contacts and moves with the recording material R and a sensor with a detection portion for detecting the movement of the contacting portion. The detection portion can detect the movement of the contacting portion by optically detecting the contacting portion or the detectable portion that moves in conjunction with the contacting portion.

Figure 5:
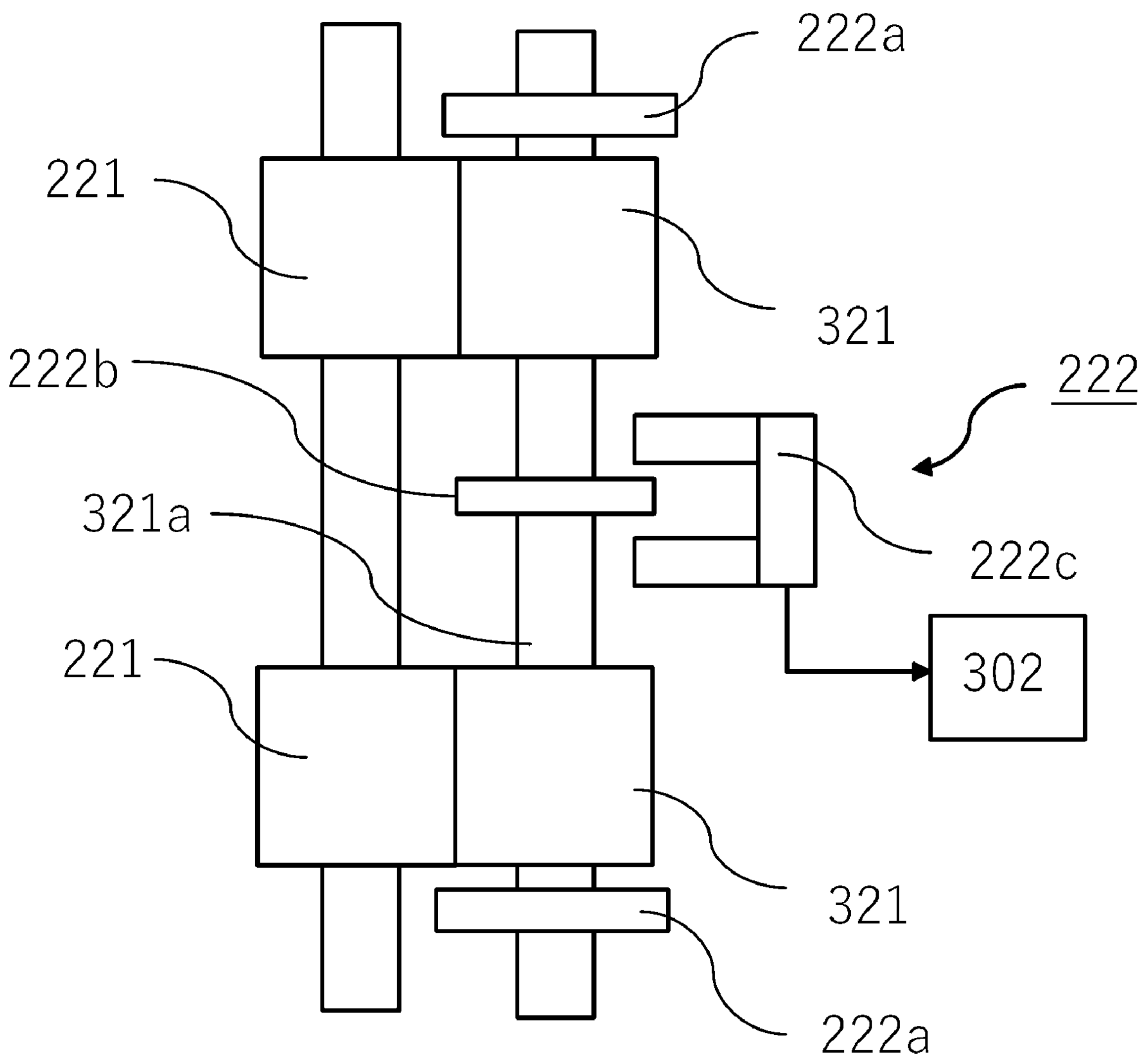
FIG. 5 is a drawing showing the configuration of the registration sensor according to embodiments 1 and 2.

FIG. 5 shows the configuration of the registration sensor 222 in the present embodiment. The registration sensor 222 has a contacting portion **222*a* that contacts and moves with the recording material R, a detected portion 222*b*, and a detection portion 222*c* that detects the movement of the detected portion 222*b***.

The contacting portion **222*a* and the detected portion 222*b* are attached to the rotary shaft 321*a* of the driven roller 321 that contacts the registration roller 221**.

The contacting portion **222*a* of the registration sensor 222 in the present embodiment has the function of contacting the recording material R and correcting skew. There are a plurality of contacting portions (shutters) 222*a* in the rotation direction of the registration roller 221. The contacting portions 222*a* have the function of contacting the recording material R before the leading end of the recording material R reaches the nip portion of the registration roller pair (registration roller 221 and driven roller 321) to correct skew. As the contacting portion 222*a* is pushed and moved by the leading end of the recording material R, the registration roller pair conveys the recording material R whose skew has been corrected, and the registration sensor 222** detects the leading end of the recording material R.

In the conveyance direction of the recording material R, the registration sensor 222 and the registration roller 221 are located just before the secondary transfer position.

A sensor that optically detects the recording material R or a sensor employing other methods can be used to detect the recording material R.

(Conveyance Speed Control: Acceleration/Deceleration)

The timing chart in FIG. 3 is used to explain the conveyance speed control that aligns the leading end of the recording material R with the leading end of the image by implementing acceleration/deceleration of the paper feeding motor 332 when a long sheet of paper is conveyed. First, the controller portion 301 sends a print start command 401 to the engine control portion 302. When the engine control portion 302 receives the print start command 401, it starts preparing for printing and instructs the feeding conveyance control portion 330 to start preparing for paper feeding.

Next, the engine control portion 302 instructs the controller portion 301 with an image forming start instruction 402 when it is ready to start image forming. When the controller portion 301 receives the image forming start instruction 402, it starts sending video signals, and the engine control portion 302 starts image formation (403) based on the received video signals. The image (400) generated by the image forming control portion 320 enters the secondary transfer portion after a predetermined time has passed. Meanwhile, the feeding conveyance control portion 330 starts feeding the recording material R and then continues conveying the recording material R at the conveyance speed V0 (441). The feeding conveyance control portion 330 starts detecting the leading end of the recording material R with the registration sensor 222 (411) based on the image forming start timing (403) of the image forming control portion 320. The speed V0 is the conveyance speed of the recording material R in the secondary transfer portion and is hereinafter referred to as the transfer implementation speed V0.

Thereafter, the feeding conveyance control portion 330 starts conveyance speed control (acceleration/deceleration) at the timing (412) when the leading end of the recording material R reaches the registration sensor 222 (413). The feeding conveyance control portion 330 calculates the following quantities in order to align the timing between the leading end of the recording material R and the leading edge of the image and to cause the recording material R to enter the secondary transfer portion. That is, the feeding conveyance control portion 330 calculates the leading amount S1 (444), which is the distance that the recording material R precedes the image (leading distance), from the difference between the distance from the leading end of the recording material R to the secondary transfer roller 212 and the distance from the leading end of the image to the secondary transfer roller 212. As shown in FIG. 3 (viii), the leading amount S1 is represented by a trapezoidal area in the graph of time and speed. The feeding conveyance control portion 330 determines the speed V1 (442) to delay the conveyance speed of the recording material R by the calculated leading amount S1 (444) and the timing (445) to return to the transfer implementation speed V0 (441) in the secondary transfer portion. Since the recording material R is ahead, the speed V1 is slower than the transfer implementation speed V0 (V1<V0).

Here, when the recording material R precedes the image, it means a state in which the recording material R reaches the secondary transfer position at an earlier timing than the toner image on the intermediary transfer belt 213 if the conveyance of the recording material R is continued as it is. Conversely, when the toner image on the intermediary transfer belt 213 reaches the secondary transfer position at a timing earlier than the arrival of the recording material R, the image is referred to as preceding. It is possible to control the timing of the toner image to be transferred onto the intermediary transfer belt 213 earlier when the recording material R is ahead of the image. However, there are cases where it takes time to develop the print data, and in this case, the recording material R is eventually ahead, so the conveyance speed of the recording material R is slowed down or paused. The feeding conveyance control portion 330 drives the paper feeding motor 332, which is the driving source of the registration roller 221 nipping the recording material R, at the determined speed V1 and timing (445). This aligns the leading end of the image with the leading end of the recording material R and waits until the material is fed again from the reversing path (414).

Next, the engine control portion 302 starts image formation (405) on the reverse side in the same manner as the front side at an arbitrary timing after image formation is completed (404). As described in the recording material conveyance operation and the recording material conveyance control during reversal in FIG. 1, after the transfer to the recording material R, the image is fixed to the recording material R by the fixing device 214. Based on the timing 421 when the leading end of the recording material R reaches the discharge sensor 233, the reversing solenoid 345 (430) is driven (431) to change the conveyance direction of the recording material R to the reversing roller pair 230.

Then, based on timing 422 when the trailing end of the recording material R exits the discharge sensor 233, the reversing solenoid 345 (430) is stopped (432), the rotation direction of the reversing roller pair 230 is changed, and the conveyance rollers convey the recording material R to the reversing path. At timing 415, when the leading end of the recording material R reaches the registration sensor 222 (410) during the conveyance on the reversing path, the feeding conveyance control portion 330 again starts conveyance speed control (acceleration/deceleration) (416). The feeding conveyance control portion 330 calculates the preceding amount of recording material R, S2 (446), in the same manner as in the conveyance speed control for the first side image. The feeding conveyance control portion 330 calculates the conveyance speed V2 (443) to delay the conveyance speed of the recording material R and the timing (447) to return to the transfer implementation speed V0 (441). The feeding conveyance control portion 330 implements conveyance speed control to match the timing between the leading end of the recording material R and the leading end of the image. Since the recording material R is ahead of the image, the speed V2 is slower than the transfer implementation speed V0 (V2<V0). The feeding conveyance control portion 330 then waits for the subsequent recording material R to be fed (417). As an embodiment of the above explanation, the recording material R precedes the image (400), and conveyance speed control that delays the recording material R is described, but if the image precedes the recording material R, conveyance speed control that speeds up the conveyance of the recording material R is implemented. In other words, the feeding conveyance control portion 330 calculates the speed that is faster than the transfer implementation speed V0 and the timing to return to the transfer implementation speed V0.

(Conveyance Speed Control: Pause)

Next, the timing chart in FIG. 4 is used to explain the case in which the motor is paused to align the leading end of the recording material R with the leading end of the image when a long sheet of paper is conveyed. Since the control of the first side and the basic control operation are the same as in FIG. 3, only the parts that differ from FIG. 3 are explained here.

If image formation begins (405) later than in FIG. 3 by the amount of time 407 due to a delay in the print start command 406 from the controller portion 301, etc., the recording material R precedes the image by the amount of time 407. In such a case, even if the motor is set to the lowest controllable speed when conveyance speed control is implemented, the leading of the recording material R may not be fully resolved. Therefore, the leading of the recording material R cannot be eliminated only by the acceleration/deceleration of the motor.

In such a case, the feeding conveyance control portion 330 must perform the following operations. That is, at the timing when the registration sensor 222 detects the leading end of the recording material R (415), the motor is temporarily stopped to stop the conveyance of the recording material R in order to align the timing between the leading end of the recording material R and the leading end of the image. Then, by advancing only the leading end of the image, the leading of the recording material R is eliminated.

At the timing when the leading end of the recording material R reaches the re-feeding position 418, the motor is re-driven so that the recording material R enters the secondary transfer portion.

Here, the fixing motor 352 is also the driving source of the fixing device 214. The fixing motor 352 needs to continue driving the fixing device 214 in order to secure the temperature required for the fixing operation. If the fixing motor 352 is stopped and then driven again, a certain amount of time is required before the temperature required for the fixing operation is secured.

As mentioned above, the registration sensor 222 is located just before the secondary transfer position, so the distance between the registration sensor 222 and the fixing device 214 is short. If the fixing motor 352 is stopped when the leading end of the recording material R reaches the registration sensor 222, the recording material R may reach the fixing device 214 before the temperature required for the fixing operation is secured when the motor is driven again. Therefore, when the leading end of the recording material R reaches the registration sensor 222, the driving of the fixing motor 352 is continued. Furthermore, when the fixing motor 352 is driven in the present embodiment, the reversing roller pair 230 is always configured to be driven in conjunction with the fixing motor 352.

Figure 6:
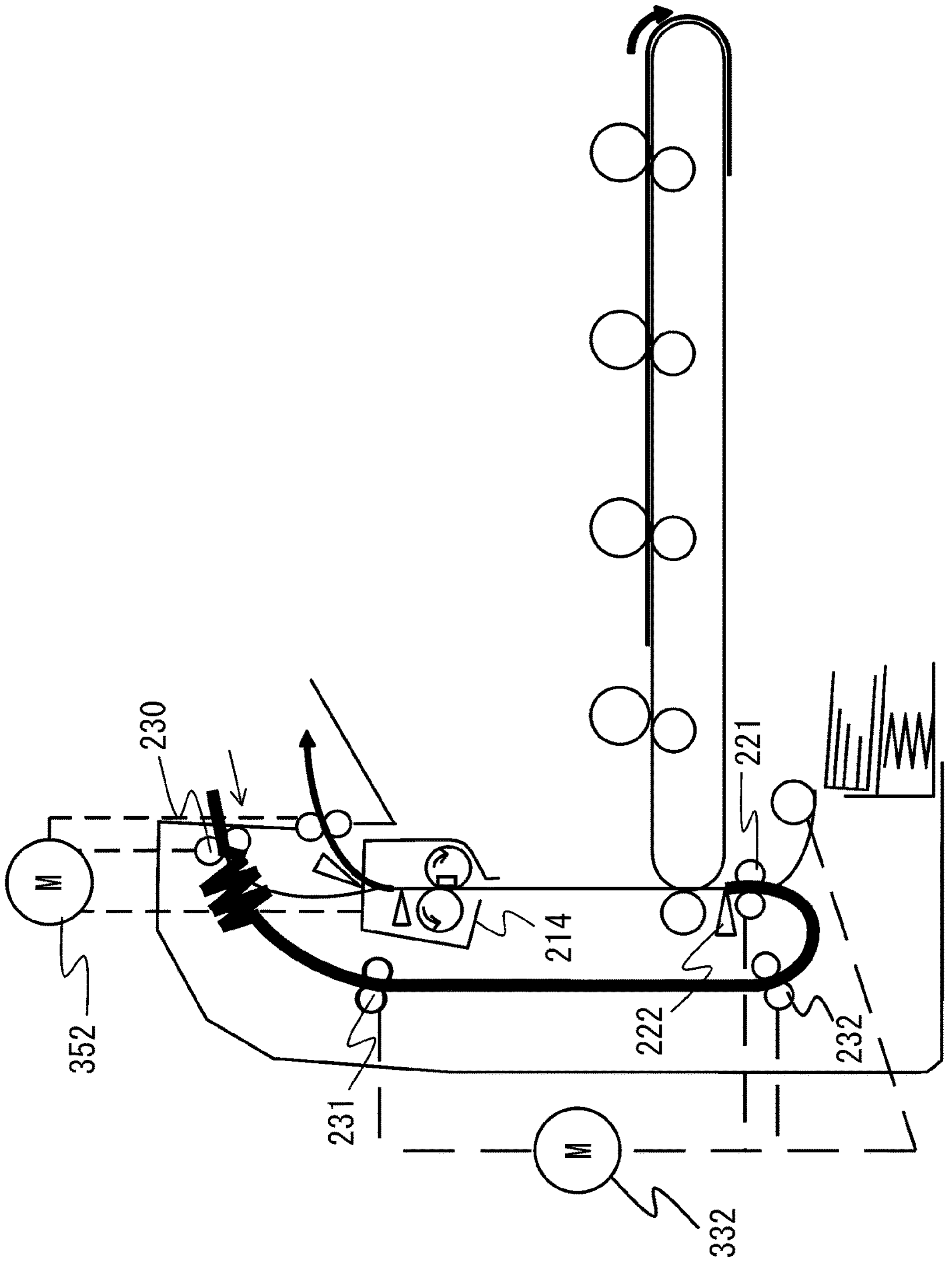
FIG. 6 is a cross-sectional drawing showing embodiment 1 when a pause is made during double-sided printing on a long sheet of paper.

In the case where the recording material R is stopped once to eliminate the leading of the recording material R, the following issue arises when a long sheet of paper is used as the recording material R. As shown in FIG. 6, when the paper feeding motor 332 is stopped, the registration roller 221 and conveyance roller pairs 231 and 232, among the rollers nipping the recording material R, are stopped. On the other hand, the fixing motor 352 cannot be stopped, and the reversing roller pair 230 continues conveying the recording material R toward the inside of the apparatus, causing the recording material R to be squished (accordion-like shape) and thus damaged.

(Control in Embodiment 1)

In embodiment 1, the timing at which the reversing solenoid 345 is stopped in the case of the example in FIG. 6 determines the conveyance speed from the reversing path to the registration sensor 222 and the timing for returning to the speed before the change. As a result, in controlling the conveyance speed when the leading end is detected by the registration sensor 222, the preceding amount of the recording material R can be reduced to an amount that can be resolved by motor acceleration/deceleration, and the conveyance can be continued without stopping the paper feeding motor 332 and fixing motor 352.

In other words, according to the control in embodiment 1, after the leading end of the recording material R as a long sheet of paper to be printed on both sides reaches the registration sensor 222, when the first control described above is performed, the acceleration/deceleration of the conveyance of the recording material R is performed, but the recording material R is not stopped. In other words, the conveyance of the recording material R is continued.

In embodiment 1, the following control is performed when the recording material R is a predetermined recording material with a length that is conveyed by the registration roller 221 with the trailing end of the recording material R not passing through the reversing roller pair 230. This control is performed when the predetermined recording material is actually conveyed by the reversing roller pair 230 and registration roller 221 (i.e., when double-sided printing is performed). Before performing the first control described above, the feeding conveyance control portion 330 performs the second control (S3, described below) to decelerate the conveyance speed of the predetermined recording material upstream in the conveyance direction from the registration sensor 222 or to stop the conveyance of the predetermined recording material. As an example of the predetermined recording material, long sheets of paper are used in embodiment 1. The predetermined recording material can also be a recording material having a length that enables the leading end of the recording material R to reach the registration roller 221 while the trailing end of the recording material R is not passing through the reversing roller pair 230.

Figure 7:
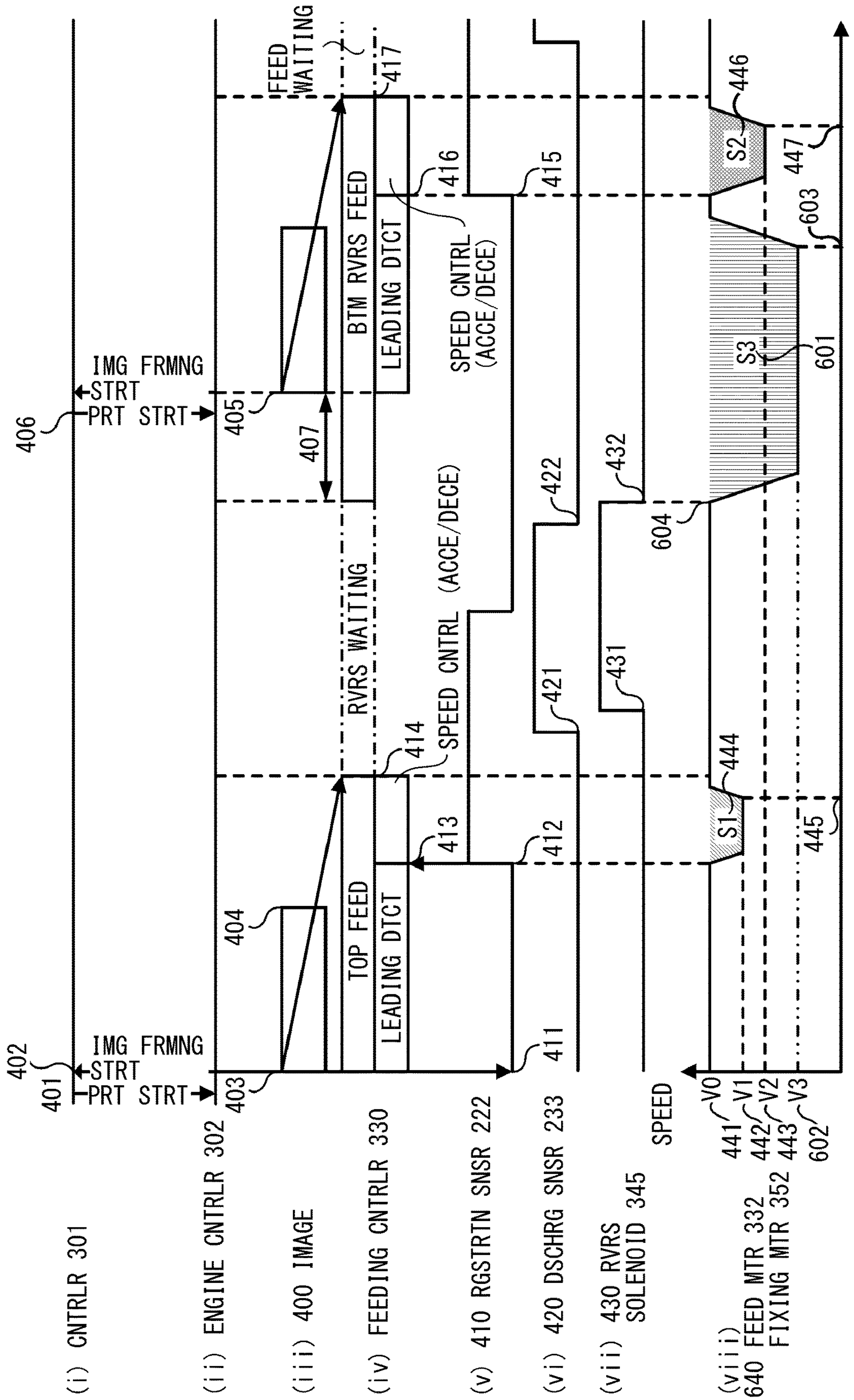
FIG. 7 is a timing chart showing the conveyance speed control during double-sided printing of a long sheet of paper according to embodiment 1.

FIG. 7 is a timing chart for the case described in FIG. 4, when the control of embodiment 1 is applied. (i) through (vii) of FIG. 7 are the same as (i) through (vii) of FIGS. 3 and 4. (viii) of FIG. 7 shows the speeds of paper feeding motor 332 and fixing motor 352. Since the control of the first side and the basic control operation are the same as in FIGS. 3 and 4, only the parts that differ from those in FIGS. 3 and 4 are explained here.

At timing 604, when the reversing solenoid 345 is stopped (432) and the feeding conveyance control portion 330 begins conveying the recording material R in the direction of the registration sensor 222 using the reversing path, the following calculation is made. With respect to the image, the predetermined position in front of the secondary transfer position is called the leading end detection equivalent position of the registration sensor 222. The distance between the predetermined position and the secondary transfer position is equivalent to the distance from the leading end detection position by the registration sensor 222 to the secondary transfer portion. The feeding conveyance control portion 330 calculates the preceding amount S3 (601) of the recording material R relative to the image from the difference between the distance from the leading end position of the recording material R to the leading end detection position of the registration sensor 222 and the distance from the leading end position of the image to the leading end detection equivalent position of the registration sensor 222. Hereafter, the position of the leading end of recording material R may be referred to as the paper leading end position, and the position of the leading end of the image may be referred to as the image leading end position.

The feeding conveyance control portion 330 calculates the speed V3 (602) to delay the conveyance speed of the recording material R by the preceding amount S3 (601) and the timing (603) to return to the transfer implementation speed V0 (441) before the change. Note that speed V3 is slower than the transfer implementation speed V0 because the recording material R is ahead ($V3<V0$). Although $V3<V2$ in (viii) of FIG. 7, speed V3 is not necessarily $V3<V2$ depending on conditions.

At this time, the long sheet of paper, which is the recording material R, is nipped by the reversing roller pair 230, which is driven by the fixing motor 352. Therefore, in addition to the paper feeding motor 332, the speed of the fixing motor 352 is also changed to V3 (602) and V0 (441) (640). The speed of the paper feeding motor 332 is then changed from a transfer implementation speed of V0 (441) to a speed of V3 (602) (604).

Thereafter, the conveyance speed control portion 3304 of the paper feeding motor 332 returns the speed of the paper feeding motor 332 from the speed V3 (602) to the transfer implementation speed V0 (441) after a predetermined time (603). In other words, the engine control portion 302 controls the paper feeding motor 332 and fixing motor 352 so that the conveyance speed of the recording material R becomes the transfer implementation speed V0 after the second control is performed and before the first control is performed. As a result, the leading end of the image is in a more advanced position than when the control to eliminate the leading amount S3 is not implemented, the leading amount of the recording material R becomes smaller, and acceleration/deceleration can be selected instead of a pause of the motors when conveyance speed control is implemented. Then, at the timing (415) when the leading end of the recording material R reaches the registration sensor 222, the conveyance speed control (first control) (FIG. 3), which performs acceleration and deceleration of the motor as described in FIGS. 3 and 4, is implemented to align the leading end of the recording material R with the leading end of the image.

The operation to convey the recording material R by the speed V3 is basically performed when the recording material R is ahead of the image. Therefore, in most cases, the speed V2 of the paper feeding motor 332 after the recording material R reaches the registration sensor 222 is slower than the transfer implementation speed V0. However, as a result of delaying the arrival of the recording material R at the registration sensor 222, the image may precede the recording material R. In this case, the speed V2 of the paper feeding motor 332 after the recording material R reaches the registration sensor 222 is faster than the transfer implementation speed V0.

When the recording material R is not a long sheet of paper, the leading end of the recording material R is in contact with the registration sensor 222 and the trailing end of the recording material R is not in contact with the reversing roller pair 230. In this case, even if the paper feeding motor 332 is stopped and the fixing motor 352 is driven when the leading end of the recording material R reaches the registration sensor 222, the recording material R will not be damaged. Therefore, if the recording material R is not a long sheet of paper, it is not necessary to perform the control described above.

In the image forming apparatus 200 in the present embodiment, the first conveyance means driven by the paper feeding motor 332 includes a plurality of first rollers (registration roller 221, conveyance roller pair 231, and conveyance rollers of the roller pair 231). The conveyance roller of the conveyance roller pair 231 is one of the plurality of first rollers and is located next to the reversing roller of the reversing roller pair 230.

The reversing roller pair 230 conveys the recording material R so that a portion of the recording material R protrudes outside the casing of the image forming apparatus 200. When the conveyance direction of the recording material R that has passed through the fixing device 214 is reversed and double-sided printing is performed, the reversing roller pair 230 is positioned at the position farthest from the registration sensor 222 with respect to the reversed conveyance direction.

As a result, when the recording material R has a length that leaves the reversing roller pair 230 when the leading end of the recording material R reaches the registration sensor 222, it is allowed to stop conveyance rollers in the first control.

(Conveyance Speed Control in Embodiment 1)

Figure 8:
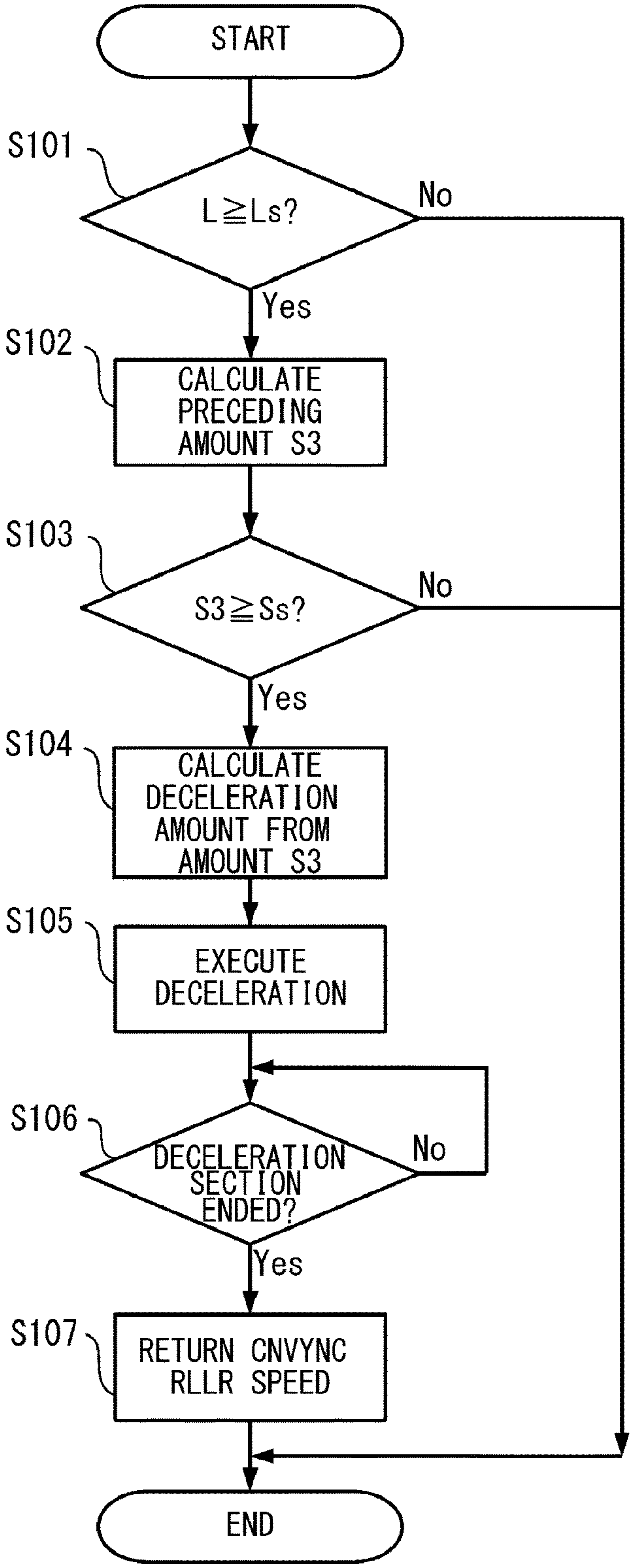
FIG. 8 is a flowchart showing the conveyance speed control during the reversing operation of a long sheet of paper according to embodiment 1.

Next, of the control described in FIG. 7, the control from stopping the reversing solenoid 345 (604) and starting the conveyance speed control (415) of the recording material R to the reversing path is described using FIG. 8.

In step (hereinafter referred to as S) 101, the feeding conveyance control portion 330 determines whether the length L of the recording material R is greater than or equal to the length threshold Ls of the recording material R. If, at S101, the feeding conveyance control portion 330 determines that the length L of the recording material R to be actually conveyed is less than the length threshold Ls of the recording material R, the process is terminated. In this case, when the leading end of the recording material R reaches the leading end detection position of the registration sensor 222, the recording material R is not nipped by the reversing roller pair 230, which is operated by the fixing motor 352. Therefore, a decelerated conveyance speed is not performed, and conveyance speed is continued at the same speed. On the other hand, if the feeding conveyance control portion 330 determines in S101 that the length L of the recording material R is greater than the length threshold Ls, the process proceeds to S102. In this case, when the leading end of the recording material R reaches the leading end detection position of the registration sensor 222, the recording material R is nipped by the reversing roller pair 230, which is operated by the fixing motor 352.

At S102, the feeding conveyance control portion 330 calculates the time from the current paper leading end position to the leading end detection position of the registration sensor 222, and the time from the current image leading end position to the leading end detection equivalent position of the registration sensor 222. The feeding conveyance control portion 330 calculates the preceding amount S3 of the recording material R for the image by finding the difference between the two amounts.

In S103, the feeding conveyance control portion 330 determines whether the leading amount S3 determined in S102 is greater than or equal to the threshold preceding amount Ss. Here, the threshold leading amount Ss is the leading amount that can be eliminated when the motor is driven at the slowest controllable speed and the motor drive speed is returned at the slowest timing when the motor acceleration/deceleration is performed in conveyance speed control.

As explained in FIG. 6, if the leading end of the recording material R reaches the position of the registration sensor 222 at the timing when there is a large leading amount of the recording material R and the leading of the recording material R cannot be eliminated by implementing motor acceleration/deceleration, the conveyance speed control of a pause or deceleration is implemented.

If the feeding conveyance control portion 330 determines in S103 that the leading amount S3 is smaller than the leading amount threshold Ss, it does not perform a decelerated conveyance operation, continues conveying at the same speed, and terminates the process. On the other hand, if the feeding conveyance control portion 330 determines in S103 that the leading amount S3 is greater than the leading amount threshold Ss, it proceeds to S104. In this case, the conveyance operation of the recording material R is performed at a slower conveyance speed.

In S104, the feeding conveyance control portion 330 calculates the necessary conveyance roller deceleration amount from the leading amount S3 of the recording material R. As explained in FIG. 7, the feeding conveyance control portion 330 calculates the speed V3 to slow down the recording material R and the timing (603) to return to the original transfer implementation speed V0 from the leading amount S3 of the recording material R to the image. At S105, the feeding conveyance control portion 330 decelerates the paper feeding motor 332 and fixing motor 352. As described in FIG. 7, the feeding conveyance control portion 330 changes the speed of the paper feeding motor 332 and fixing motor 352 to a speed to delay the recording material R, e.g., speed V3.

In S106, the feeding conveyance control portion 330 determines whether the deceleration area has ended or not, and if it determines that it has not ended, the process returns to S106, and if it determines that it has ended, the process proceeds to S107. In other words, in this judgment, the feeding conveyance control portion 330 checks the timing (603) to return to the original transfer implementation speed V0 from the speed V3 for slowing down the recording material R determined in S104. The deceleration interval is the interval from 604 to 603 in (viii) of FIG. 7. In S107, the feeding conveyance control portion 330 returns the paper feeding motor 332 and fixing motor 352 to the transfer implementation speed V0 before the process of S105 is performed, and the process is terminated.

As described above, the conveyance speed of the motor from the reverse start position of the recording material to the leading end detection position of the registration sensor 222 and the timing of returning the motor speed are determined to convey along the reverse path. This eliminates the leading of the recording material R at the timing when the leading end is detected by the registration sensor 222, and the conveyance speed control can use the acceleration and deceleration of the motor, in other words, align the recording material with the leading end of the image without having to pause the motor. Furthermore, if the recording material R is not a long sheet of paper, control may be performed to pause the recording material R downstream from the registration sensor 222.

Note that embodiment 1 does not limit the invention as claimed in the claims, and not all of the features described in embodiment 1 are essential to the solution of the invention.

Thus, the feeding conveyance control portion 330 determines the leading distance at which the predetermined recording material precedes the toner image based on the difference between the first and second time at the time when the toner image formation by each cartridge starts (FIG. 4, 405). Here, the first time is the time until the leading end of the recording material R is detected by the registration sensor 222. The second time is the time for the image to reach a predetermined position upstream of the secondary transfer position in the moving direction of the intermediary transfer belt 213 (a position equivalent to the leading end detection of the registration sensor 222). The distance between the predetermined position and the secondary transfer position corresponds to the distance from the registration sensor 222 to the secondary transfer position. The feeding conveyance control portion 330 determines the first speed (V3) of the paper feeding motor 332 and fixing motor 352 in the second control described above based on the calculated leading distance, and the timing (603) to return to the second speed (transfer implementation speed V0) before the second control is performed.

According to embodiment 1 described above, image formation can be performed successfully without affecting the recording material in an image forming apparatus in which conveyance to the secondary transfer position is performed by multiple drive sources.

Embodiment 2

In embodiment 1, when the start of image forming was delayed, the conveyance speed from the reverse path to the registration sensor 222 and the timing to return to the conveyance speed before the change were determined and controlled. This described how to implement acceleration/deceleration of the paper feeding motor 332 and fixing motor 352 by controlling the conveyance speed when the leading end of the recording material R is detected by the registration sensor 222.

However, if the start of image formation is further delayed the following may happen. Even if the conveyance speed is reduced to the lower limit in the control of embodiment 1, when the leading end is detected by the registration sensor 222, a pause may be selected in the conveyance speed control because the leading of the paper position has not been resolved with respect to the position of the leading end of the image.

When the fixing motor 352, which is the driving motor for the reversing roller pair 230, is stopped, the fixing temperature control must also be stopped. For this reason, when the fixing motor 352 is stopped after a pause is selected in the conveyance speed control described above, the fixing temperature control is stopped as well. In other words, the heating operation of the heater 226 of the fixing device 214 is stopped. As a result, the temperature of the fixing device 214 decreases. Thereafter, when the fixing motor 352 is driven again to resume the temperature control, if the distance from the leading end detection position of the registration sensor 222 of the recording material R to the entry into the fixing device 214 is short, only the time to convey the material for that distance is available to implement the temperature control. In other words, since the recording material R reaches the fixing device 214 before the temperature of the fixing device 214 reaches the temperature at which it can be fixed, the toner image may not be properly fixed to the recording material R.

Therefore, in light of this situation, in embodiment 2, when the leading end of the recording material R reaches any position upstream in the conveyance direction from the registration sensor 222, conveyance is stopped, and the leading of the paper with respect to the image leading end position is eliminated before conveying again to the registration sensor 222. The position at which the recording material R is stopped is determined so that the temperature of the fixing device 214 can reach a temperature at which the recording material R can be fixed before the conveyance of the recording material R is resumed and the recording material R reaches the fixing device 214.

When the control in embodiment 2 is implemented, the leading of the recording material R is eliminated at the timing when the leading end is detected by the registration sensor 222, so the conveyance speed control can use the acceleration/deceleration of the paper feeding motor 332 to align the leading end position of the paper with the leading end position of the image.

In other words, in embodiment 2, the feeding conveyance control portion 330 performs the following control when the recording material R precedes the toner image even if the first speed is the slowest of the speeds of the paper feeding motor 332 and the fixing motor 352 in the second control described in embodiment 1. The feeding conveyance control portion 330 performs the third control described below (hereinafter referred to as "fixing portion pause control") to stop the conveyance of the recording material R before the leading end of the recording material R reaches the registration sensor 222.

(Control when Fixing Drive is Paused)

Figure 9:
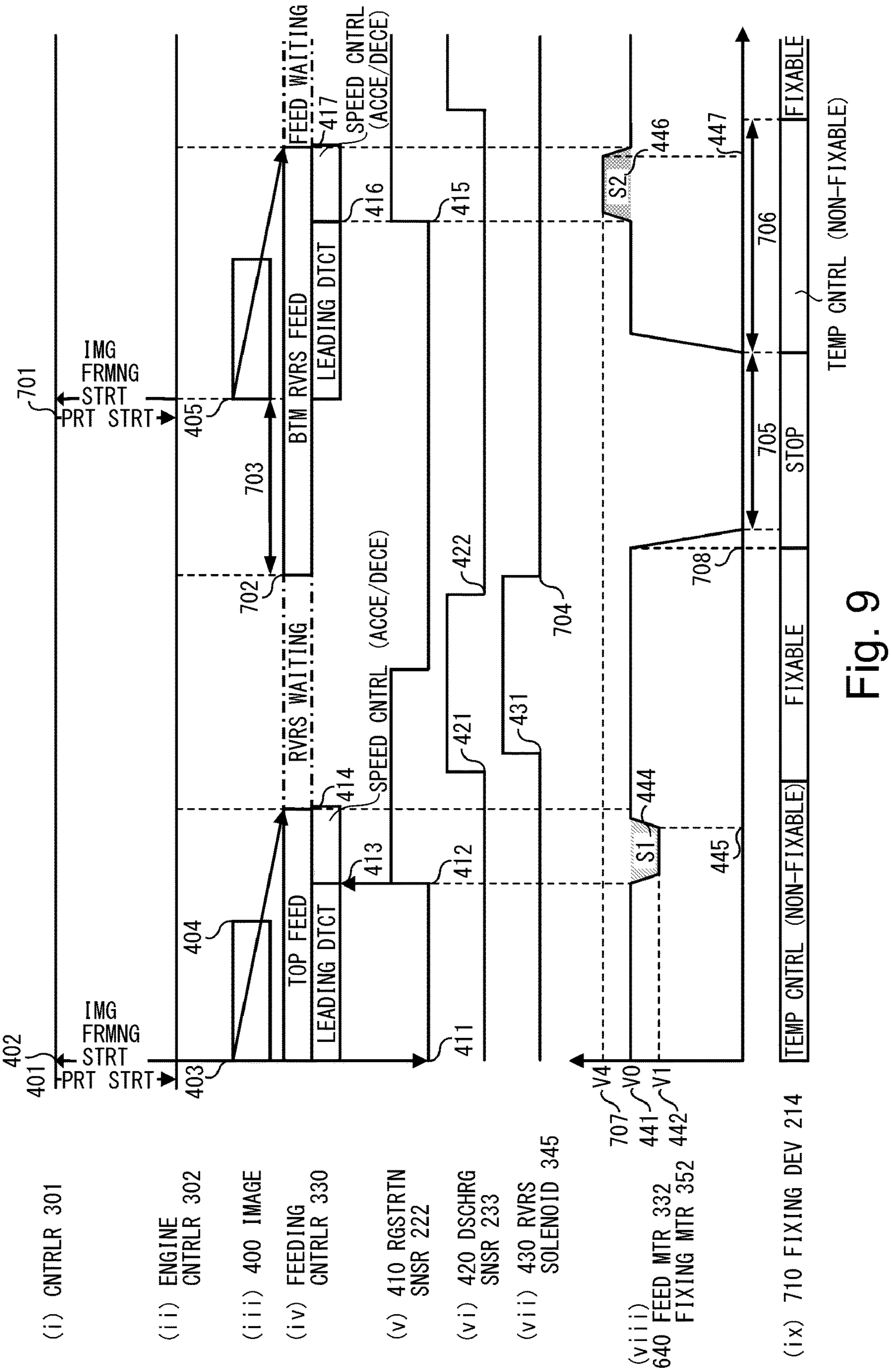
FIG. 9 is a timing chart showing the conveyance speed control during double-sided printing of a long sheet of paper according to embodiment 2.

FIG. 9 shows the timing chart when control in embodiment 2 is applied in a case where the start of image forming is further delayed than the situation assumed in embodiment 1. (i) though (viii) of FIG. 9 are the same as (i) through (viii) of FIG. 7. (ix) of FIG. 9 shows the state 710 of the fixing device 214 (fixing temperature control in progress (fixing impossible), fixing possible, stopped, etc.). Since the basic control operation is the same as in embodiment 1 described in FIG. 7, the same symbols are attached to the same events, and only the parts that differ from those in FIG. 7 are described here.

If the start of image forming on the back side of the recording material R is delayed (405) due to a delayed print start command (701) from the controller portion 301 or other reasons, the leading amount is determined by comparing the leading end position of the image with the leading paper position at the timing (704) when the reversing portion of the recording material R begins to be conveyed into the reverse path. Here, the difference between the timing of the start of image formation (702) when the leading amount becomes 0 and the timing when image formation actually starts (405) is calculated, and the image formation delay time 703 is determined. To eliminate the leading of the recording material R for the delayed image forming time 703, which is caused by the delayed start of image forming, a conveyance paused time 705 is determined for the same amount of time as the delayed image forming time 703.

Next, the temperature of the fixing device 214 that would decrease if the fixing temperature control of the fixing device 214 were stopped for the conveyance paused time 705, according to the fact that the fixing motor 352 was also stopped, is calculated. When the fixing device 214 (fixing motor 352) is restarted, the temperature control is resumed and the time 706 is determined until the temperature reaches a temperature at which toner can be fixed. The amount by which the temperature of the fixing device 214 drops (temperature drop amount) between the time when the temperature control is stopped and the time when the temperature control is restarted and the time 706, until the fixing portion is ready to fix the toner, does not necessarily have to be a value calculated and determined by the engine control portion 302. For example, a value determined in advance by experiment or other means may be stored in the memory portion of the engine control portion 302, and the engine control portion 302 may use the value stored in the memory portion.

The following control is then performed to ensure that the recording material R has time to enter the fixing device 214 for the time 706 described above. It is assumed here that the recording material R is conveyed to the fixing device 214 at the transfer implementation speed V0 (441) and at the maximum speed V4 (V4>V0) (707) of the paper feeding motor 332 and fixing motor 352 when conveyance speed is controlled. In this case, the timing 708 upstream from the fixing device 214 (hereinafter referred to as conveyance paused timing) is determined by the distance that the recording material R is conveyed during the time 706. In the example shown in FIG. 9, in the conveyance speed control, the recording material R is conveyed at the maximum speed V4, which is greater than the transfer implementation speed V0, in other words, the conveyance of the recording material R is accelerated, but this is not limited to this. In the conveyance speed control, there may be a case of deceleration as shown in 446 of (viii) of FIG. 7 in embodiment 1.

Conveyance paused time 705 is waited to elapse by stopping the fixing motor 352 and the paper feeding motor 332 at the timing when the leading end of the recording material R reaches the conveyance paused timing 708 at the transfer implementation speed V0. After the conveyance paused time 705 has elapsed, the fixing motor 352 and the paper feeding motor 332 are re-driven to resume conveying the recording material R at the transfer implementation speed V0, and the recording material R is conveyed until the leading end of the recording material R is detected by the registration sensor 222.

At the timing (415) when the leading end of the recording material R is detected by the registration sensor 222, the leading of the recording material R is eliminated by the control that stops the recording material R upstream in the conveyance direction from the registration sensor 222. Therefore, when the conveyance speed control (first control) described in FIG. 3 is performed, the leading end position of the paper feeding motor 332 and the fixing motor 352 can be aligned with the leading end position of the image without pausing the conveyance of the recording material R, or in other words, without pausing the driving of the paper feeding motor 332 and the fixing motor 352.

(Conveyance Speed Control Process when the Fixing Drive is Paused)

Figure 10:
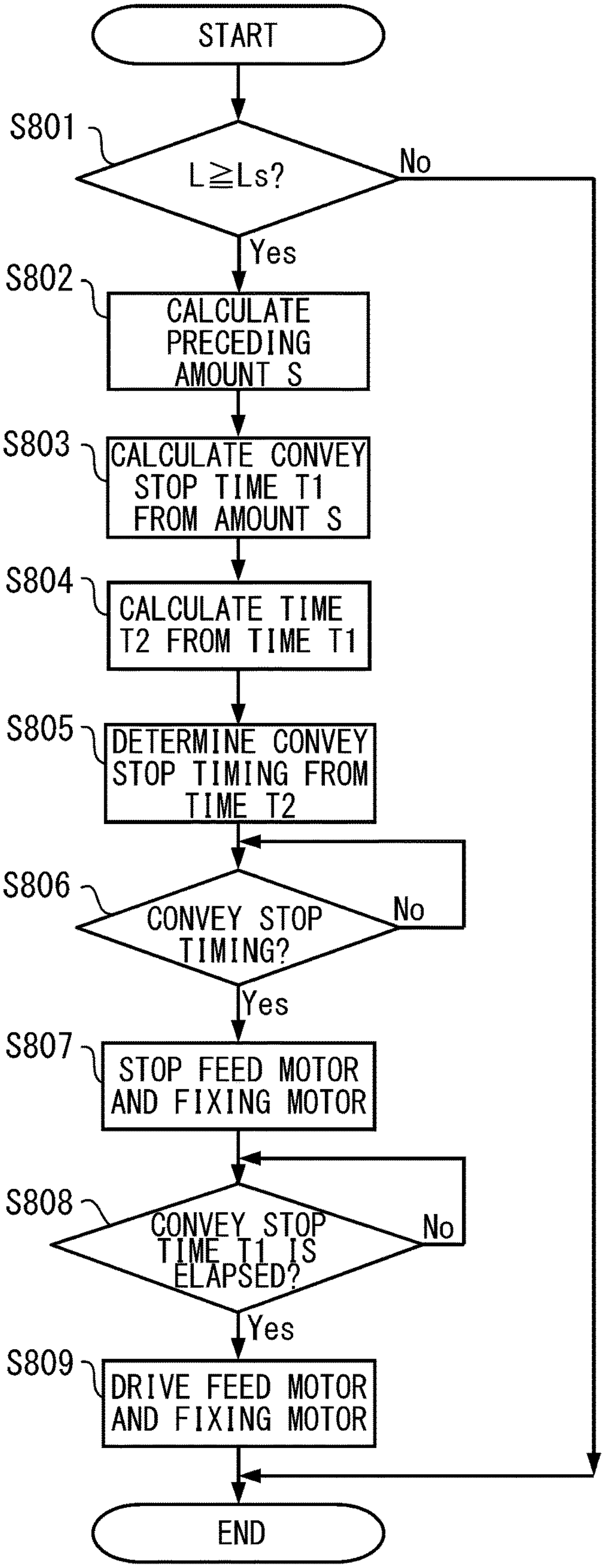
FIG. 10 is a flowchart showing the conveyance speed control during the reversing operation of a long sheet of paper according to embodiment 2.

FIG. 10 is used to explain the pause control of the fixing drive, described in FIG. 9, when a pause is made between the start of conveying of the recording material R to the reverse path and the start of conveyance speed control to eliminate the leading of the recording material R. At S801, the feeding conveyance control portion 330 determines whether the length L of the recording material R is greater than or equal to the threshold value Ls based on information obtained from the controller portion 301 or the operating portion 251. If the feeding conveyance control portion 330 determines at S801 that the length L of the recording material R is less than the threshold value Ls, it does not implement the pause control of the fixing drive and terminates the process. If the feeding conveyance control portion 330 determines at S801 that the length L of the recording material R is greater than or equal to the threshold value Ls, it proceeds to S802 to implement the pause control of the fixing drive.

In S802, the feeding conveyance control portion 330 calculates the time required for the recording material R to be conveyed at the conveyance speed V0 from the current paper leading end position to the secondary transfer position and the time required for the toner image on the intermediary transfer belt 213 to be conveyed from the current image leading end position to the secondary transfer position. The feeding conveyance control portion 330 calculates the leading amount S of the recording material R for the image by taking the difference between the two times obtained. Since the image leading end position cannot be determined when the image formation has not yet started, the feeding conveyance control portion 330 determines the time from the current point in time until the next image formation is performed with secondary transfer, and calculates the leading amount S based on this time.

At S803, the feeding conveyance control portion 330 calculates the conveyance paused time T1 ((ix) of FIG. 9, 705) described above to eliminate the leading amount S calculated at S802. In S804, the feeding conveyance control portion 330 calculates the amount by which the temperature of the fixing device 214 decreases as the conveyance paused time T1 (705) elapses, during which the fixing roller 223 and temperature control are stopped. The feeding conveyance control portion 330 calculates the time T2 (time 706 mentioned above) (from fixing re-drive to the time it becomes available for fixing) to recover the amount of temperature drop.

In S805, the feeding conveyance control portion 330 calculates the distance D over which the recording material R is conveyed at the transfer implementation speed V0 when the fixing motor 352 is driven for the time T2 (706) calculated in S804. The feeding conveyance control portion 330 determines the conveyance paused timing 708 at which the paper reaches the position upstream by the distance D from the current paper leading end position by the distance D from the timing at which the recording material R enters the fixing device 214. If the time T2 cannot be secured without stopping at a position upstream from the current leading end of the paper, the feeding conveyance control portion 330 in embodiment 2 determines that it cannot eliminate the leading of the recording material R and fix the toner image appropriately. The feeding conveyance control portion 330 then notifies the controller portion 301 to that effect.

At S806, the feeding conveyance control portion 330 determines whether the conveyance paused timing 708 calculated at S805 has been reached by referring to the timer, and if it determines that the conveyance paused timing 708 has not been reached, the process returns to S806. If the feeding conveyance control portion 330 determines in S806 that the conveyance paused timing 708 has been reached, the process proceeds to S807.

In S807, the feeding conveyance control portion 330 stops driving the paper feeding motor 332 and the fixing motor 352 to stop the conveyance of the recording material R.

At S808, the feeding conveyance control portion 330 determines whether the conveyance paused time T1 calculated in S803 has elapsed by referring to the timer. If the feeding conveyance control portion 330 determines at S803 that the conveyance paused time T1 has not elapsed, it returns the process to S808. If at S808, the feeding conveyance control portion 330 determines that the conveyance paused time T1 has elapsed, the process proceeds to S809.

In S809, the feeding conveyance control portion 330 resumes driving the paper feeding motor 332 and fixing motor 352, and returns to the speed (e.g., transfer implementation speed V0) before stopping in S807. In embodiments 1 and 2, in the area where no conveyance speed control (acceleration/deceleration control) is performed, the conveyance of the recording material R is set to the transfer implementation speed V0, but this is not limited to this. The conveyance speed of the recording material R in the area without conveyance speed control may be determined between the maximum speed (V4) and the minimum speed of the paper feeding motor 332 and fixing motor 352, depending on the image forming conditions.

As described above, in embodiment 2, the conveyance is stopped so that the leading end of the recording material stops at any position upstream in the conveyance direction from the registration sensor 222, the leading of the recording material is eliminated, and then the material is conveyed again to the registration sensor 222. This eliminates the leading of the recording material R at the timing when the leading end of the recording material is detected by the registration sensor 222, and the conveyance speed control can align the leading end position of the paper with the leading end position of the image using motor acceleration/deceleration. Embodiments 1 and 2 do not limit the invention as claimed in the claims, and not all of the features described in the examples are essential to the solution of the invention.

Thus, the feeding conveyance control portion 330 determines the stop time to stop conveying the predetermined recording material based on the difference between the first and second times. The first time is the time until the leading end of the recording material R is detected by the registration sensor 222. The second time is the time for the image to reach a predetermined position upstream of the secondary transfer position in the moving direction of the intermediary transfer belt 213. The distance between the predetermined position and the secondary transfer position corresponds to the distance from the registration sensor 222 to the secondary transfer position. The feeding conveyance control portion 330 determines the temperature of the heater that decreases during the stop time based on the determined stopping time, and determines the recovery time until the heater temperature recovers to the temperature before it decreases based on the determined temperature. The feeding conveyance control portion 330 determines the conveyance paused timing (708 in FIG. 10) to stop the paper feeding motor 332 and the fixing motor 352 in the third control described above so that the predetermined recording material reaches the fixing device 214 after the recovery time has elapsed.

According to embodiment 2 described above, image formation can be performed successfully without affecting the recording material in an image forming apparatus that uses multiple drive sources to convey the recording material R up to the secondary transfer position.

According to the present invention, image formation can be performed successfully without affecting the recording material in an image forming apparatus that uses multiple drive sources to convey the material to the secondary transfer position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-071381 filed on Apr. 25, 2022 and 2023-051507 filed on Mar. 28, 2023, which are hereby incorporated by reference herein in their entirety.

What is claimed is:

1. An image forming apparatus comprising:

a first conveyance unit configured to convey a recording material;

a first driving unit configured to drive the first conveyance unit;

a second conveyance unit configured to convey the recording material, the second conveyance unit being provided upstream of the first conveyance unit in a conveyance direction of the recording material;

a second driving unit configured to drive the second conveyance unit, the second driving unit being different from the first driving unit;

an intermediary transfer member configured to carry a toner image transferred from a photosensitive drum;

a transfer unit configured to transfer the toner image on the intermediary transfer member to the recording material in a transfer position;

a detecting unit configured to detect the recording material, the detecting unit being provided upstream of the transfer position in the conveyance direction; and a control unit configured to execute a first control in response to an arrival of a leading end of the recording material to the detecting unit, the control unit controls in the first control the first driving unit to accelerate or decelerate a conveyance speed of the recording material, wherein in a case in which (i) the recording material has a length such that the recording material is conveyed by the first conveyance unit in a state in which a trailing end of the recording material has not passed the second conveyance unit and (ii) the recording material is conveyed by the first conveyance unit and the second conveyance unit, the control unit executes a second control before executing the first control and a conveyance of the recording material is continued in the first control, and wherein in the second control, the control unit decelerates the conveyance speed of the recording material upstream of the detecting unit in the conveyance direction, or controls the first driving unit and the second driving unit so as to stop the conveyance of the recording material.

2. An image forming apparatus according to claim 1, further comprising an image forming unit including the photosensitive drum and configured to form the toner image onto the intermediary transfer member, wherein the control unit acquires a first speed of the first driving unit and the second driving unit in the second control and a timing of returning the first speed to a second speed based on a preceding distance by which the recording material precedes the toner image.

3. An image forming apparatus according to claim 2, wherein in a case in which the recording material precedes the toner image even if the first speed is set to the lowest speed of speeds of the first driving unit and the second driving unit in the second control, the control unit executes a third control in which the control unit controls the first driving unit and the second driving unit so as to stop the conveyance of the recording material before the leading end of the recording material reaches the detecting unit.

4. An image forming apparatus according to claim 3, further comprising a fixing device including a heater, provided downstream of the transfer position and configured to fix the toner image on the recording material, wherein the first conveyance unit is a first roller provided upstream of the transfer position and configured to convey the recording material, wherein the first driving unit is a first motor configured to drive the first roller, wherein the second driving unit is a second roller configured to convey the recording material, passed through the fixing device, to the transfer position, wherein the second driving unit is a second motor configured to drive the fixing device and the second roller and to rotate the second roller in a first direction and a second direction opposite to the first direction, and wherein in the fixing device a temperature of the heater decreases while a driving of the second motor is stopped.

5. An image forming apparatus according to claim 4, wherein the first conveyance unit includes a plurality of the first rollers, and one of the plurality of the first rollers is disposed adjacent to the second roller.

6. An image forming apparatus according to claim 4, wherein the control unit (1) acquires a stop time when the conveyance of the recording material is to be stopped and a recovery time required for the temperature decreasing during the stop time to be recovered to the temperature before decreasing, and (2) determines a timing when the first driving unit and the second driving unit are to be stopped in the third control so that the recording material reaches the fixing device after the recovery time elapses.

7. An image forming apparatus according to claim 1, further comprising a fixing device including a heater, provided downstream of the transfer position and configured to fix the toner image on the recording material, wherein the first conveyance unit is a first roller provided upstream of the transfer position and configured to convey the recording material, wherein the first driving unit is a first motor configured to drive the first roller, wherein the second driving unit is a second roller configured to convey the recording material, passed through the fixing device, to the transfer position, and wherein the second driving unit is a second motor configured to drive the fixing device and the second roller and to rotate the second roller in a first direction and a second direction opposite to the first direction.

8. An image forming apparatus according to claim 7, wherein the first conveyance unit includes a plurality of the first rollers, and one of the plurality of the first rollers is disposed adjacent to the second roller.

9. An image forming apparatus according to claim 1, wherein the detecting unit includes a contacting portion configured to correct a skewness of the recording material by contacting the recording material.

10. An image forming apparatus according to claim 1, wherein when the conveyance speed of the recording material in the transfer position is a transfer speed, the conveyance speed of the recording material in the second control is slower than the transfer speed.

11. An image forming apparatus according to claim 10, wherein the control unit controls the first driving unit and the second driving unit so that the recording material is conveyed at the transfer speed after executing the second control and before executing the first control.

* * * * *